(12) United States Patent
Di

(10) Patent No.: US 11,662,635 B2
(45) Date of Patent: May 30, 2023

(54) DISPLAY DEVICE, DISPLAY PANEL AND METHOD FOR MANUFACTURING SAME

(71) Applicant: BOE Technology Group Co., Ltd., Beijing (CN)

(72) Inventor: Yunping Di, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/515,243

(22) Filed: Oct. 29, 2021

(65) Prior Publication Data

US 2022/0197094 A1  Jun. 23, 2022

(30) Foreign Application Priority Data

Dec. 23, 2020  (CN) .......................... 202011535526.1

(51) Int. Cl.
  *G02F 1/1362* (2006.01)
  *G06V 40/13* (2022.01)
  *G02F 1/1368* (2006.01)

(52) U.S. Cl.
  CPC ...... *G02F 1/136222* (2021.01); *G02F 1/1368* (2013.01); *G02F 1/136209* (2013.01); *G02F 1/136286* (2013.01); *G06V 40/1318* (2022.01)

(58) Field of Classification Search
  CPC ............. G02F 1/13338; G02F 1/13318; G02F 1/133616; G02F 1/136209
  See application file for complete search history.

(56) References Cited

U.S. PATENT DOCUMENTS

| | | | |
|---|---|---|---|
| 2020/0034599 A1* | 1/2020 | Chen | G06V 40/1318 |
| 2020/0134281 A1 | 4/2020 | Han et al. | |
| 2020/0193126 A1 | 6/2020 | Shi et al. | |

FOREIGN PATENT DOCUMENTS

| | | |
|---|---|---|
| CN | 103019474 A | 4/2013 |
| CN | 106959757 A | 7/2017 |
| CN | 107978609 A | 5/2018 |
| CN | 109521590 A | 3/2019 |
| CN | 110309775 A | 10/2019 |
| KR | 20070106278 A | 11/2007 |

OTHER PUBLICATIONS

CN202011535526.1 first office action.

* cited by examiner

*Primary Examiner* — James A Dudek
(74) *Attorney, Agent, or Firm* — IPro, PLLC

(57) ABSTRACT

Provided is a display panel. The display panel includes an array substrate, a color filter substrate, and a backlight module, wherein the array substrate includes a substrate and a photoelectric sensing device, the substrate is provided with a fingerprint recognition region, and an orthographic projection of the photoelectric sensing device on the substrate is within the fingerprint recognition region. The color filter substrate is disposed opposite to the array substrate, the backlight module is disposed on a side, distal from the array substrate, of the film substrate, and light emitted from the backlight module is capable of passing through the fingerprint recognition region.

10 Claims, 12 Drawing Sheets

DISPLAY DEVICE, DISPLAY PANEL AND METHOD FOR MANUFACTURING SAME

CROSS-REFERENCE TO RELATED APPLICATION

This application is based on and claims priority to the Chinese Patent Application No. 202011535526.1, filed on Dec. 23, 2020 and entitled "DISPLAY DEVICE, DISPLAY PANEL AND METHOD FOR. MANUFACTURING SAME," the disclosure of which is herein incorporated by reference in its entirety.

TECHNICAL FIELD

The present disclosure relates to the field of display technologies, and more particularly, to a display device, a display panel and a method for manufacturing the same.

BACKGROUND

With the development of display technologies, in-cell liquid crystal display (LCD) devices are widely used due to small volume, thinness, low power consumption, and the like merits.

SUMMARY

Embodiments of the present disclosure provide a display device a display panel and a method for manufacturing the same.

According to one aspect of the embodiments of the present disclosure, a display panel is provided. The display panel includes:

an array substrate, including a substrate and a photoelectric sensing device, wherein the substrate is provided with a fingerprint recognition region, and an orthographic projection of the photoelectric sensing device on the substrate is within the fingerprint recognition region;

a color filter substrate, disposed opposite to the array substrate;

a backlight module, disposed on a side, distal from the array substrate, of the color filter substrate, wherein light emitted from the backlight module is capable of passing through the fingerprint recognition region.

In some embodiments, the array substrate further includes:

a driving layer, disposed between the substrate and the photoelectric sensing device, wherein the driving layer includes a sensing circuit, an orthographic projection of the sensing circuit on the substrate being at least partially within the fingerprint recognition region, and the sensing circuit being connected to the photoelectric sensing device.

In some embodiments, the array substrate further includes:

a pixel electrode, disposed on a side, distal from the substrate, of the photoelectric sensing device; and the driving layer further includes a pixel circuit, wherein the pixel circuit is connected to the pixel electrode.

In some embodiments, a plurality of photoelectric sensing devices and a plurality of pixel electrodes are provided; the sensing circuit includes a plurality of first transistors in one-to-one correspondence with a plurality of the photoelectric sensing devices; and the pixel circuit includes a plurality of second transistors in one-to-one correspondence with a plurality of pixel electrodes, wherein both the plurality of first transistors and the plurality of second transistors are arranged in an array;

wherein the plurality of first transistors are connected to the plurality of photoelectric sensing devices in one-to-one correspondence, and the plurality of second transistors are connected to the plurality of pixel electrodes in one-to-one correspondence.

In some embodiments, the array substrate further includes: a first light shielding layer, disposed on a side, distal from the substrate, of the driving layer;

the first light shielding layer includes: a plurality of first light shielding units in one-to-one correspondence with the plurality of first transistors, and a plurality of second light shielding units in one-to-one correspondence with the plurality of second transistors, wherein both the plurality of first light shielding units and the plurality of second light shielding units are arranged in an array;

wherein an orthographic projection of each of the first light shielding units on the substrate is at least partially overlapped with an orthographic projection of a first transistor corresponding to the first light shielding unit on the substrate, and an orthographic projection of each of the second light shielding units on the substrate is at least partially overlapped with an orthographic projection of a second transistor corresponding to the second light shielding unit on the substrate.

In some embodiments, the array substrate further includes: a second light shielding layer, disposed between the driving layer and the substrate;

wherein the second light shielding layer includes: a plurality of third light shielding units in one-to-one correspondence with the plurality of first transistors, and a plurality of fourth light shielding units in one-to-one correspondence with the plurality of second transistors, wherein both the plurality of third light shielding units and the plurality of fourth light shielding units are arranged in an array;

wherein an orthographic projection of each of the third light shielding units on the substrate is at least partially overlapped with an orthographic projection of the first transistor corresponding to third light shielding unit on the substrate, and an orthographic projection of each of the fourth light shielding units on the substrate is at least partially overlapped with an orthographic projection of the second transistor corresponding to the fourth light shielding unit on the substrate.

In some embodiments, both the first transistor and the second transistor include:

an active layer, disposed on a side, proximal to the first light shielding layer, of the substrate;

a gate insulating layer, covering the active layer;

a gate, disposed on a side, distal from the substrate, of the gate insulating layer;

an inter-level dielectric layer, covering the gate and the gate insulating layer; and a first source-drain layer, disposed on a side, distal from the substrate, of the inter-level dielectric layer and including a source and a drain, wherein the source and the drain are connected to both ends of the active layer respectively.

In some embodiments, the driving layer further includes: a first insulating layer and a second source-drain layer; wherein the first insulating layer covers the first source-drain layer; and the second source-drain layer is disposed on a side, distal from the substrate, of the first insulating layer and includes a first conductive layer and a second conductive layer that are spaced apart, wherein the first conductive layer is connected to the drain of the first transistor, and the second conductive layer is connected to a drain of the second transistor; and the second source-drain layer and the first light shielding layer are disposed in a same layer.

In some embodiments, the array substrate further includes:

a protection layer, covering the second source-drain layer and the surface of the first light shielding layer, wherein the photoelectric sensing device is disposed on an upper surface of the protection layer and is connected to the second source-drain layer through a via extending through the protection layer;

a planarization layer, covering the protection layer and the photoelectric sensing device; and a conductive layer, disposed on a side, distal from the projection layer, of the planarization layer and including a first conductor and a second conductor, wherein the first conductor is connected to the photoelectric sensing device, and the second conductor is connected to the second conductive layer.

In some embodiments, the array substrate further includes:

a driving layer, disposed on the side, distal from the substrate, of the photoelectric sensing device, wherein the driving layer includes a sensing circuit, an orthographic projection of the sensing circuit being at least partially within the fingerprint recognition region, and the sensing circuit being connected to the photoelectric sensing device.

In some embodiments, the array substrate further includes:

a pixel electrode, disposed on a side, distal from the substrate, of the driving layer; and the driving layer further includes a pixel circuit, wherein the pixel circuit is connected to the pixel electrode.

In some embodiments, wherein a plurality of photoelectric sensing devices and a plurality of pixel electrodes are provided; the sensing circuit includes a plurality of first transistors in one-to-one correspondence with the plurality of photoelectric sensing devices, and the pixel circuit includes a plurality of second transistors in one-to-one correspondence with the plurality of pixel electrodes, wherein both the plurality of first transistors and the plurality of second transistors are arranged in an array;

wherein the plurality of first transistors are connected to the plurality of photoelectric sensing devices in one-to-one correspondence, and the plurality of second transistors are connected to the plurality of pixel electrodes in one-to-one correspondence.

In some embodiments, the array substrate further includes: a first light shielding layer, disposed on the side, distal from the substrate, of the driving layer;

wherein the first light shielding layer includes: a plurality of first light shielding units in one-to-one correspondence with the plurality of first transistors, and a plurality of second light shielding units in one-to-one correspondence with the plurality of second transistors, wherein both the plurality of first light shielding units and the plurality of second light shielding units are arranged in an array;

wherein an orthographic projection of each of the first light shielding units on the substrate is at least partially overlapped with an orthographic project of the first transistor corresponding to the first light shielding unit on the substrate, and an orthographic projection of each of the second light shielding units on the substrate is at least partially overlapped with an orthographic projection of the second transistor corresponding to the second light shielding unit on the substrate.

In some embodiments, both the first transistor and the second transistor include:

an active layer, disposed on the side, proximal to the first light shielding layer, of the substrate;

a gate insulating layer, covering the active layer;

a gate, disposed on a side, distal from the substrate, of the gate insulating layer;

an inter-level dielectric layer, covering the gate and the gate insulating layer; and a first source-drain layer, disposed on a side, distal from the substrate, of the inter-level dielectric layer and including a source and a drain, wherein the source and the drain are connected to both ends of the active layer respectively.

In some embodiments, the driving layer further includes: a first insulating layer and a second source-drain layer;

the first insulating layer covers the first source-drain layer; and the second source-drain layer is disposed on a side, distal from the substrate, of the first insulating layer and is connected to a drain of the second transistor; and the second source-drain layer and the first light shielding layer are disposed in a same layer.

According to another aspect of the embodiments of the present disclosure, a method for manufacturing a display panel is provided. The method includes:

forming an array substrate, wherein the array substrate includes a substrate and a photoelectric sensing device, the substrate being provided with a fingerprint recognition region, and an orthographic projection of the photoelectric sensing device on the substrate being within the fingerprint recognition region;

forming a color filter substrate, wherein the color filter substrate is disposed opposite to the array substrate on a side, distal from the substrate, of the photoelectric sensing device; and forming a backlight module on a side, distal from the array substrate, of the color filter substrate, wherein light emitted from the backlight module is capable of passing through the fingerprint recognition region.

In some embodiments, forming the array substrate includes:

forming a driving layer on a side of the substrate, wherein the driving layer includes a sensing circuit, an orthographic projection of the sensing circuit on the substrate being at least partially within the fingerprint recognition region; and forming a photoelectric sensing device on a side, distal from the substrate, of the driving layer, wherein the photoelectric sensing device is connected to the sensing circuit.

In some embodiments, the method further includes:

forming a pixel electrode on a side, distal from the substrate, of the photoelectric sensing device; and wherein the driving layer further comprises a pixel circuit, the pixel circuit being connected to the pixel electrode.

In some embodiments, a plurality of photoelectric sensing devices and a plurality of pixel electrodes are provided; the sensing circuit includes a plurality of first transistors in one-to-one correspondence with a plurality of the photoelectric sensing devices; the pixel circuit includes a plurality of second transistors in one-to-one correspondence with a plurality of the pixel electrodes, wherein both the plurality of first transistors and the plurality of second transistors are arranged in an array;

wherein the plurality of first transistors are connected to the plurality of photoelectric sensing devices in one-to-one correspondence, and the plurality of second transistors are connected to the plurality of pixel electrodes in one-to-one correspondence.

According to still another aspect of the embodiments of the present disclosure, a display device is provided. The display device includes a power supply and a display panel connected to the power supply, wherein the power supply being configured to supply power to the display panel, and the display panel includes:

an array substrate, including a substrate and a photoelectric sensing device, wherein the substrate is provided with a fingerprint recognition region, and an orthographic projection of the photoelectric sensing device on the substrate is within the fingerprint recognition region;

a color filter substrate, disposed opposite to the array substrate; and a backlight module, disposed on a side, distal from the array substrate, of the color filter substrate, wherein light emitted from the backlight module is capable of passing through the fingerprint recognition region.

BRIEF DESCRIPTION OF THE DRAWINGS

The drawings herein are incorporated into the description and constitute a part of the description, wherein the drawings can illustrate embodiments consistent with the present disclosure, and are used to explain the principles of the present disclosure together with the description. Apparently, the accompanying drawings in the following description only show some embodiments of the present disclosure, and persons of ordinary skilled in the art may still derive other drawings from these accompanying drawings without creative efforts.

REFERENCE NUMERALS AND DENOTATIONS THEREOF

Figure 1:
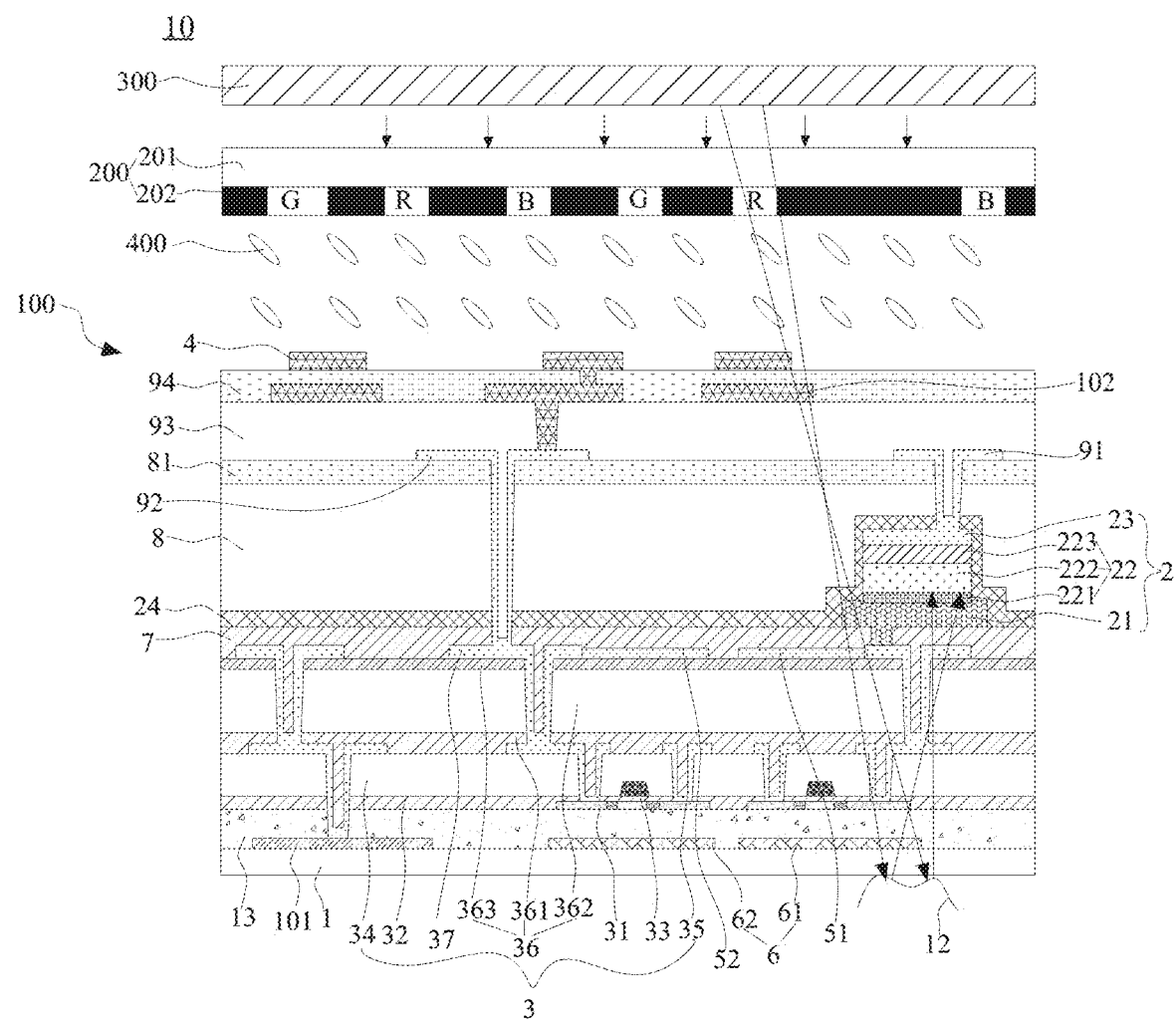
FIG. 1 is a schematic diagram of a display panel according to a first embodiment of the present disclosure.

10—display panel; 100—array substrate; 200—color filter substrate; 300—a backlight module;

400—liquid crystal layer;

1—substrate; 12—finger; 13—buffer layer;

2—photoelectric sensing device; 21—first electrode layer; 22—photoelectric functional layer;

221—P-type layer; 222—I-type layer; 223—N-type layer; 23—second electrode layer; 24—insulating material;

3—driving layer; 31—active layer; 32—gate insulating layer; 33—gate; 34—inter-level dielectric layer; 35—first source-drain layer; 36—first insulating layer; 361—first protection layer; 362—first planarization layer; 363—second protection layer; 37—second source-drain layer;

4—pixel electrode;

5—first light shielding layer; 51—first light shielding unit; 52—second light shielding unit;

6—second light shielding layer; 61—third light shielding unit; 62—fourth light shielding unit;

7—protection layer;

8—planarization layer; 81—passivation layer;

91—first conductor; 92—second conductor; 93—second planarization layer; 94—third protection layer;

101—touch control layer; 102—common electrode; 110—first inorganic barrier layer; 120—planarization layer; 130—second inorganic barrier layer; 140—conductive coating; 141—first conductive coating; 142—second conductive coating;

20—power supply.

DETAILED DESCRIPTION

Example embodiments will now be described more fully with reference to the accompanying drawings. However, the example embodiments may be implemented in various forms, and should not be construed as being limited to the embodiments set forth herein; on the contrary, these embodiments are provided such that the present disclosure will be comprehensive and complete, and fully convey the concept of the example embodiments to those skilled in the art. The same reference numerals in the figures indicate the same or similar structures, and thus their detailed descriptions will be omitted.

Although relative terms, such as "up" and "down," are used herein to describe a relative relationship of one component to another, such terms are only used in the present description for convenience, such as the directions of the examples described in the figures. It may be understood that if the device of the icon is flipped upside down, then the "up" component will be the "down" component. When a structure is "on" another structure, it is possible that a structure is integrally formed on the other structure or that the structure is "directly" disposed on the other structure or that some structure is "indirectly" disposed on the other structure by another structure.

The terms "a," "an," "this," and "the" are intended to mean that there are one or more of the elements/components or the like; the terms "include," "comprise," "have," and the derivatives thereof are intended to be inclusive and mean that there may be additional elements/components or the like, besides the listed elements/components or the like. The terms "first," "second," "third," and "fourth" are only used as differentiation, and are not limited to the number of objects.

In the related art, the amount of the sensing signal received by the existing display panel is small, and the accuracy of the fingerprint detection is low.

It should be noted that the information disclosed in the background art section above is only used to enhance the understanding of the background of the present disclosure, and therefore may include information that is not known to those of ordinary skill in the art.

Figure 2:
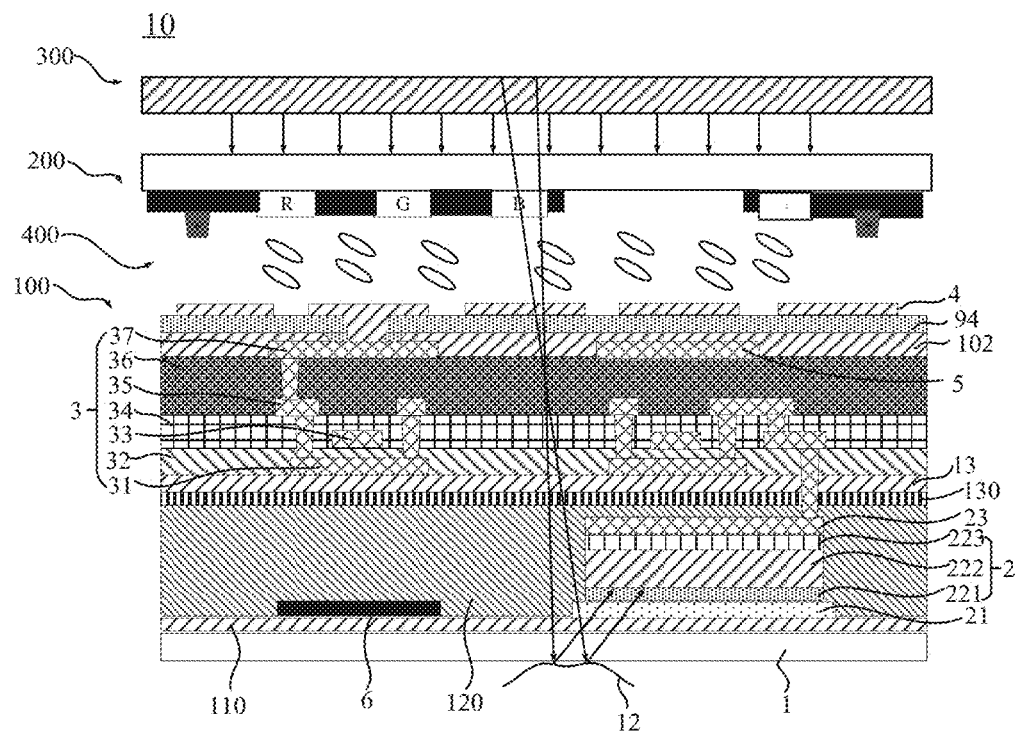
FIG. 2 is a schematic diagram of a display panel according to a second embodiment of the present disclosure.

The embodiments of the present disclosure provide a display panel which may be a liquid crystal display panel, as shown in FIGS. 1 and 2, and may include an array substrate 100, a color filter substrate 200, and a backlight module 300.

The array substrate 100 may include a substrate 1 and a photoelectric sensing device 2, wherein the substrate 1 may be provided with a fingerprint recognition region, and the orthographic projection of the photoelectric sensing device 2 on the substrate 1 may be within the fingerprint recognition region;

The color filter substrate 200 is disposed opposite to the array substrate 100;

The backlight module 300 is disposed on a side, distal from the array substrate 100, of the color filter substrate 200, wherein light emitted from the backlight module 300 is capable of passing through the fingerprint recognition region.

For the display panel of the present disclosure, light emitted from the backlight module is capable of passing through the color filter substrate 200 into the fingerprint recognition region of the array substrate 100, and then enter the photoelectric sensing device 2 after being reflected by finger 12 to realize fingerprint recognition. In this process, the color filter substrate 200 may filter light entering the array substrate 100. Moreover, since the fingerprint recognition region and the photoelectric sensing device 2 are both disposed on a side, distal from the backlight module 300, of the color filter substrate 200, light passing through the fingerprint recognition region and reflected by the fingerprint may be reflected directly into the photoelectric sensing device 2 without passing through the color filter substrate 200. Thus, the distance between the photoelectric sensing device 2 and the finger 12 may be reduced, the light loss is reduced, and then the amount of signals received by the photoelectric sensing device 2 may be increased, thereby improving the accuracy of fingerprint recognition.

Each part of the display panel in the embodiment of the present disclosure is described in detail hereinafter.

In one embodiment of the present disclosure, the array substrate 100 may include a substrate 1 and a photoelectric sensing device 2. As shown in FIGS. 1 and 2, the substrate 1 may be a flat plate structure, and may be provided with a fingerprint recognition region. The fingerprint recognition region may be a specific area in the substrate 1, and may also cover the entire surface of the substrate 1, not specifically defined herein. The substrate 1 may be a flexible substrate 1 or a hard substrate 1, not specifically defined herein.

The photoelectric sensing device 2 may be disposed on a side of the substrate 1, and the orthographic projection of the photoelectric sensing device 2 on the substrate 1 may be within the fingerprint recognition region. Light reflected by the fingerprint can enter the photoelectric sensing device 2, and the photoelectric sensing device 2 can determine the position of ridge and valley of fingerprint according to the different voltage values formed by the intensity of the light reflected by the ridge and valley of fingerprint. In this process, light reflected by the ridge of the fingerprint is stronger and the voltage is larger; light reflected by the valley of the fingerprint is weaker and the voltage is smaller. Based on this, the fingerprint detection circuit can detect the positions of ridge and valley by detecting the magnitude of the voltage in the photoelectric sensing device 2, thereby forming corresponding fingerprint image data. For example, the photoelectric sensing device 2 may be a photodiode.

A plurality of photoelectric sensing devices 2 are provided, and the plurality of photoelectric sensing devices 2 may be disposed in the same layer. Moreover, the orthographic projections of a plurality of photoelectric sensing devices 2 on the substrate 1 are all within the fingerprint recognition region, and different photoelectric sensing devices 2 can work independently without interfering with each other. Light may be reflected into different photoelectric sensing devices 2, which in turn may cause the fingerprint detection circuit to form fingerprint image data based on the voltages collected by the different photoelectric sensing devices 2.

For example, the photoelectric sensing device 2 may include a first electrode layer 21, a photoelectric functional layer 22 and a second electrode layer 23 layered in stack.

The first electrode layer 21 may be on a side of the substrate 1, wherein the first electrode layer 21 may be a transparent top electrode serving as an anode layer for the photoelectric sensing device 2, and the material of the anode layer may be a transparent conductive material. For example, the material may be indium tin oxide (ITO) or aluminum-doped zinc oxide (AZO). In some embodiments, the material of the anode layer may be AZO instead of conventional ITO to prevent the hydrogen plasma released in subsequent processes from reducing the conventional ITO film, thereby avoiding damage to the structure of the anode layer, and the production yield may be increased.

The photoelectric functional layer 22 may be disposed on a side, distal from the substrate 1, of the first electrode layer 21, which may serve as a light detector. The photoelectric functional layer 22 may be a single-layer film or a multi-layer film, not specifically limited herein. Taking the multi-layer film as an example, the multi-layer film may include a P-type layer 221, an I-type layer 222, and an N-type layer 223; and the P-type layer 221 may cover the surface of first electrode layer 21, the I-type layer 222 may cover the surface of P-type layer 221, and the N-type layer 223 may cover the surface of I-type layer 222.

The second electrode layer 23 may be disposed on a side, distal from the substrate 1, of the photoelectric functional layer 22, which may be a metal bottom electrode, and may serve as the cathode layer of the photoelectric sensing device 2. In addition, in the case that when a voltage is applied to the first electrode layer 21 and the second electrode layer 23, the photoelectric conversion may be realized by the photoelectric functional layer 22.

It should be noted that the same layer arrangement of the plurality of photoelectric sensing devices 2 may include: the first electrode layers 21 of the plurality of photoelectric sensing devices 2 are all disposed in the same layer, the photoelectric functional layers 22 of the plurality of photoelectric sensing devices 2 are all disposed in the same layer, and the second electrode layers 23 of the plurality of photoelectric sensing devices 2 are all disposed in the same layer.

The first electrode layer 21 of the photoelectric sensing device 2 may be formed on a side of the substrate 1 by vacuum evaporation, magnetron sputtering, chemical vapor deposition, or physical vapor deposition. Thereafter, the P-type layer 221, the I-type layer 222, the N-type layer 223, and the second electrode film may be sequentially deposited on the surface of first electrode layer 21. Afterward, the second electrode layer 23 is formed by etching the second electrode film by the photolithography process. Furthermore, the photoelectric sensing device 2 is formed by etching the P-type layer 221, the I-type layer 222, and the N-type layer 223 by the photolithography process with the second electrode layer 23 as a mask layer.

Figure 3:
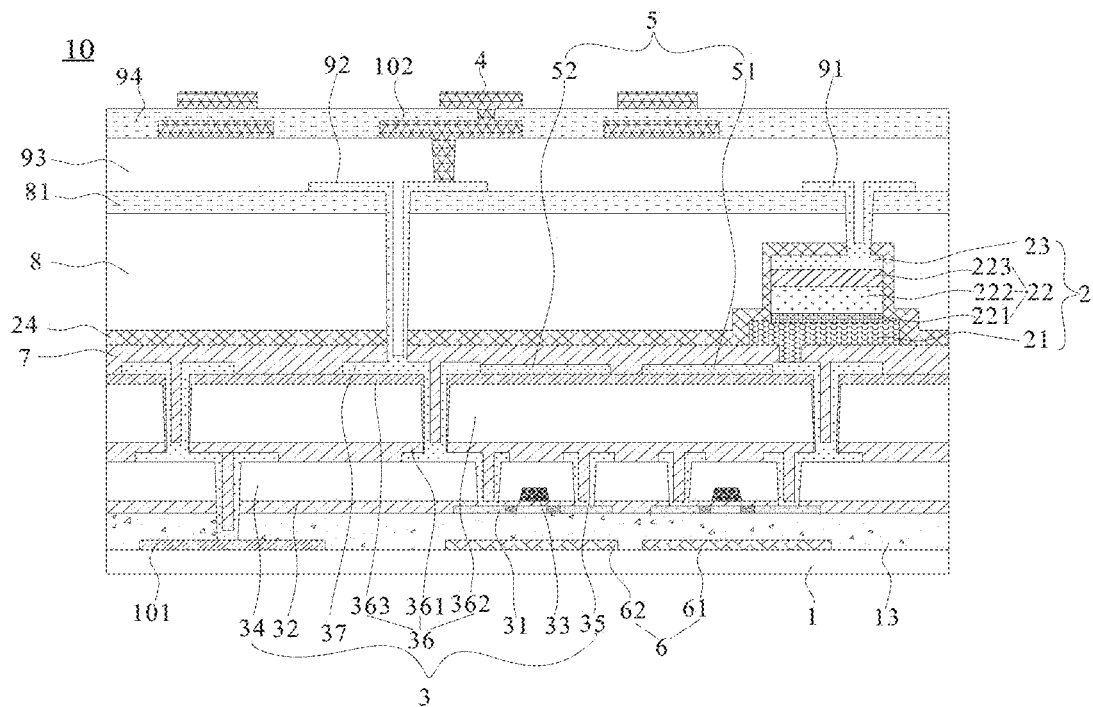
FIG. 3 is a schematic diagram of an array substrate according to the first embodiment of the present disclosure.
Figure 4:
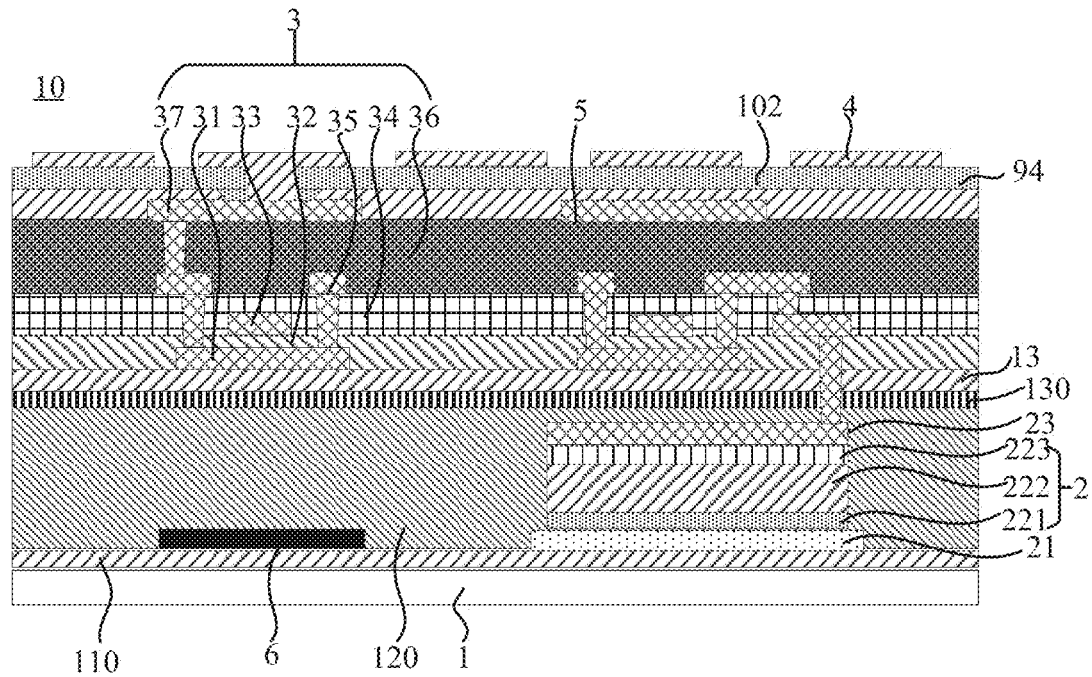
FIG. 4 is a schematic diagram of an array substrate according to the second embodiment of the present disclosure.

As shown in FIGS. 3 and 4, the array substrate 100 may further include a pixel electrode 4, which may be disposed on a side, distal from the substrate 1, of the photoelectric sensing device 2. The pixel electrode 4 can control the display of pixel to form an image. A plurality of pixel electrodes 4 are provided, wherein the pixel electrodes 4 may be arranged in one-to-one correspondence with a plurality of pixel units, so as to control a plurality of pixel units in one-to-one correspondence to emit light, thereby displaying an image.

In one embodiment of the present disclosure, the array substrate 100 may further include a driving layer 3, as shown in FIG. 3, which is disposed between the substrate 1 and the photoelectric sensing device 2, and the driving layer 3 may be electrically connected to the photoelectric sensing device 2. In a second embodiment of the present disclosure, as shown in FIG. 4, the driving layer 3 may be disposed on the side, distal from the substrate 1, of the photoelectric sensing device 2, and the driving layer 3 may be electrically connected to the photoelectric sensing device 2. In this case, the driving layer 3 may be used to drive the photoelectric conversion device 2 for photoelectric conversion.

Figure 5:
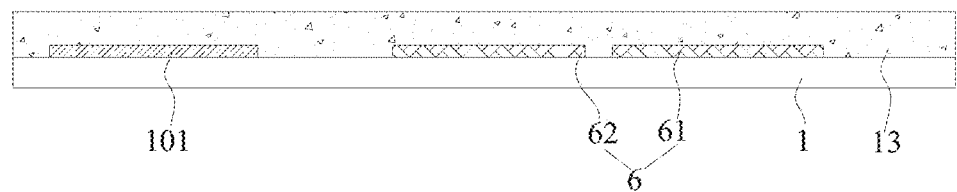
FIG. 5 is a schematic diagram of a buffer layer according to an embodiment of the present disclosure.

In one embodiment, as shown in FIG. 5, the array substrate 100 may further include a buffer layer 13. The buffer layer 13 may be formed on a side of the substrate 1 by chemical vapor deposition, physical vapor deposition, or atomic layer deposition. The buffer layer 13 may be used to block impurities in the substrate 1 from diffusing into the driving layer 3, and to protect the stability of the driving layer 3. For example, the driving layer 3 may be disposed on the surface, distal from the substrate 1, of the buffer layer 13. Meanwhile, the driving layer 3 may also be connected to the pixel electrode 4 to control the pixel electrode 4 to be powered on or off.

The driving layer 3 may include sensing circuit and pixel circuit. In this case, at least part of the orthographic projection of the sensing circuit on the substrate 1 is within the fingerprint recognition region, and the sensing circuit is electrically connected to the photoelectric sensing device 2. The orthographic projection of the pixel circuit on the substrate 1 may be within the fingerprint recognition region and may be electrically connected to the pixel electrode. The orthographic projection of the pixel circuit on the substrate 1 may also be outside the fingerprint recognition region, and the specific location of the pixel circuit is not specifically defined herein.

The sensing circuit may include a plurality of first transistors in one-to-one correspondence with the plurality of photoelectric sensing devices 2, and the plurality of first transistors are arranged in an array. The pixel circuit includes a plurality of second transistors in one-to-one correspondence with the plurality of pixel electrodes 4, and the plurality of second transistors are arranged in an array.

In this case, the plurality of first transistors may connect with the plurality of photoelectric sensing devices 2 in one-to-one correspondence in order to control a plurality of photoelectric sensing devices in one-to-one correspondence through a plurality of first transistors 2, such that the plurality of photoelectric sensing devices 2 are operated independently. The plurality of second transistors may be connected to the plurality of pixel electrodes 4 in one-to-one correspondence in order to control a plurality of pixel electrodes 4 in one-to-one correspondence through a plurality of second transistors, such that the plurality of pixel electrodes 4 can control each pixel unit to emit light independently, thereby displaying the image.

Figure 6:
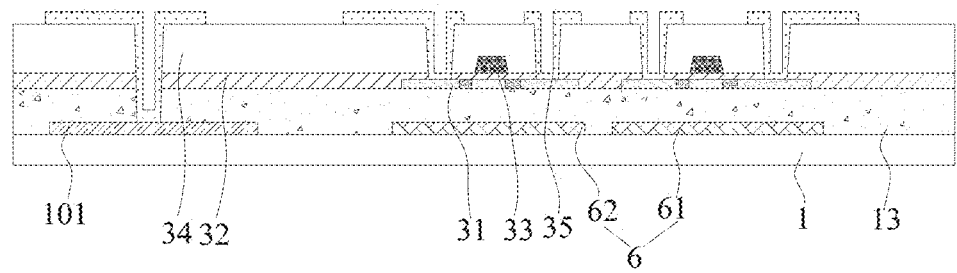
FIG. 6 is a schematic diagram of a transistor according to an embodiment of the present disclosure.
Figure 7:
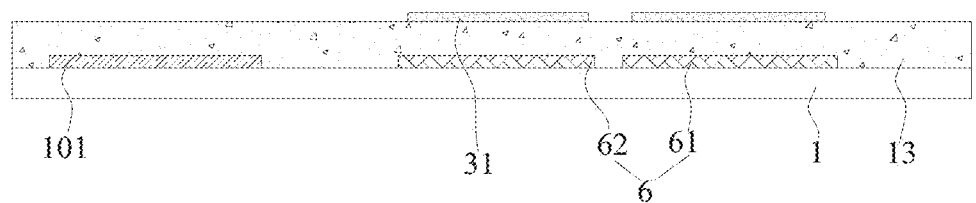
FIG. 7 is a schematic diagram of an active layer according to an embodiment of the present disclosure.
Figure 8:
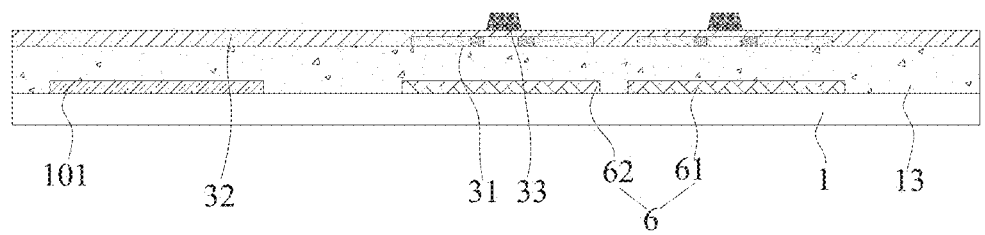
FIG. 8 is a schematic diagram of a gate insulating layer and a gate according to an embodiment of the present disclosure.
Figure 9:
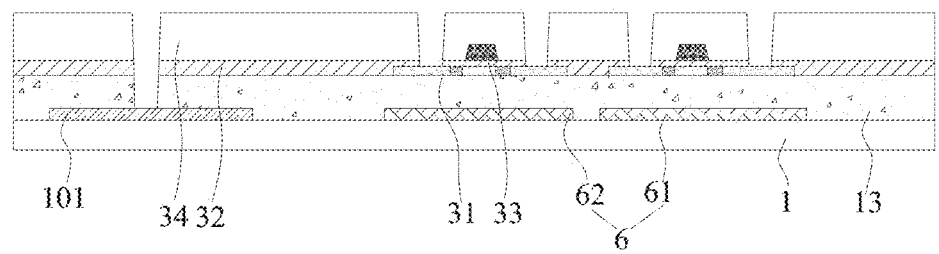
FIG. 9 is a schematic diagram of an inter-level dielectric layer according to an embodiment of the present disclosure.

As shown in FIG. 6, both the first transistor and the second transistor may include an active layer 31, a gate insulating layer 32, a gate 33, an inter-level dielectric layer 34, and a first source-drain layer 35. As shown in FIGS. 7 to 9, the active regions may be doped multiple times to form the active layer 31, which may be disposed on a side, proximal to the photoelectric sensing device 2, of the substrate 1. The gate insulating layer 32 covers on the active layer 31. The gate 33 is disposed on a side, distal from the substrate 1, of the gate insulating layer 32. The inter-level dielectric layer 34 covers on the gate 33 and gate insulating layer 32, wherein the gate insulating layer 32 and the inter-level dielectric layer may be apertured to form vias connecting the drains. The first source-drain layer 35 is disposed on a side, distal from the substrate 1, of the inter-level dielectric layer 34 and includes a source and a drain connected to both ends of the active layer 31 through vias extending through inter-level dielectric layer 34 and gate insulating layer 32.

Figure 10:
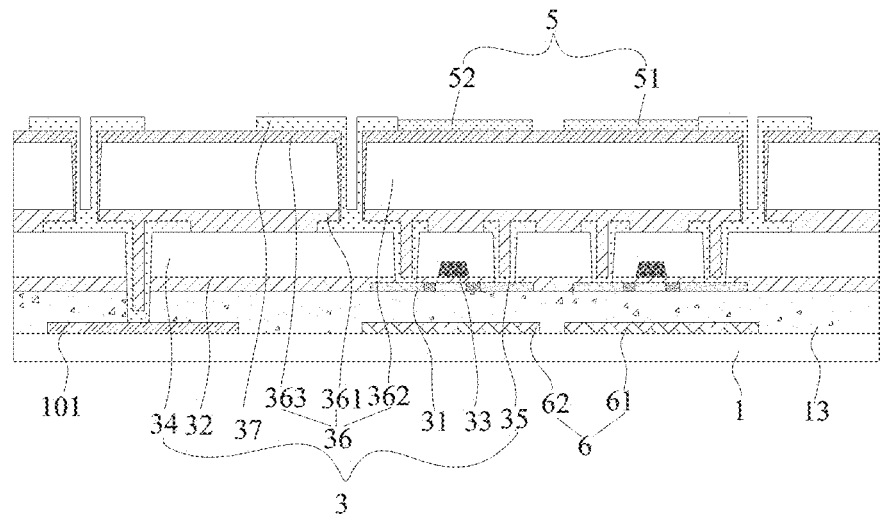
FIG. 10 is a schematic diagram of a first light shielding layer according to an embodiment of the present disclosure.
Figure 11:
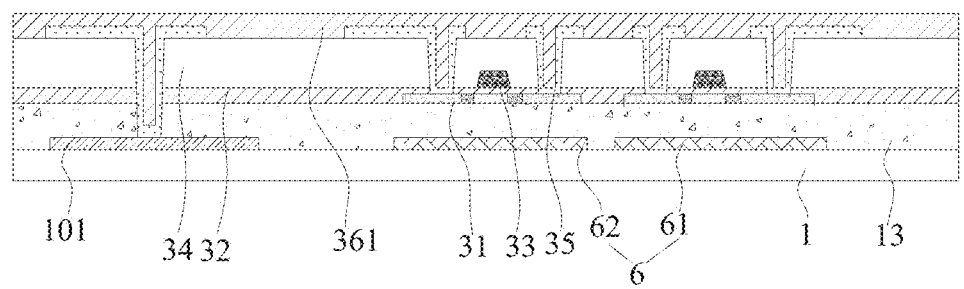
FIG. 11 is a schematic diagram of a first protection layer according to an embodiment of the present disclosure.
Figure 12:
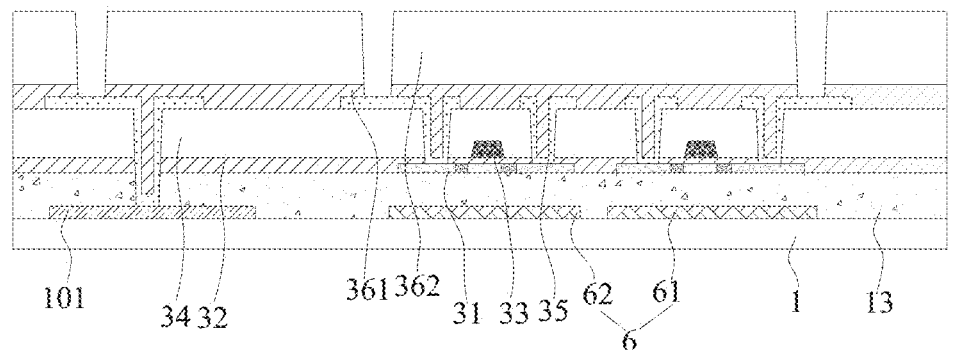
FIG. 12 is a schematic diagram of a first planarization layer according to an embodiment of the present disclosure.
Figure 13:
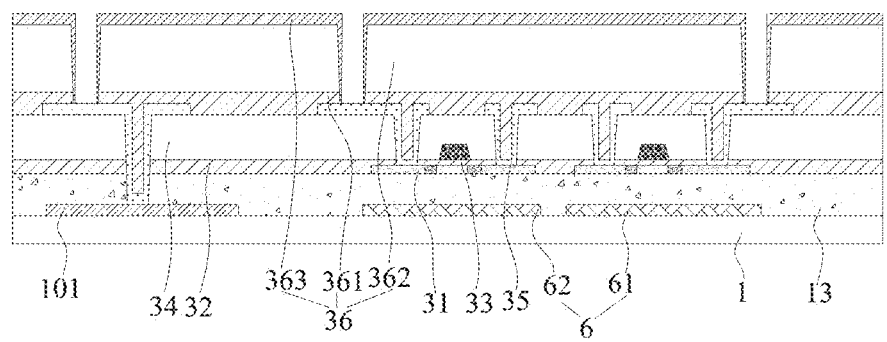
FIG. 13 is a schematic diagram of a second protection layer according to an embodiment of the present disclosure.

In addition, as shown in FIG. 10, the driving layer 3 may further include a first insulating layer 36 covering first source-drain layer 35 and second source-drain layer 37 on a side, distal from the substrate 1, of the first insulating layer 36. In this case, the first insulating layer 36 may include a first protection layer 361, a first planarization layer 362, and a second protection layer 363. As shown in FIGS. 11 to 13, the first protection layer 361 may cover the surface, distal from the substrate 1, of the first source-drain layer 35 for blocking hydrogen plasma generated in subsequent processes from diffusing toward each transistor. The first planarization layer 362 may cover the surface of the first protection layer 361, and the first planarization layer 362 and the first protection layer 361 may be opened to form vias connecting the first source-drain layer 35. The second protection layer 363 may be disposed on the surface, distal from the substrate 1, of the first planarization layer 362 so as to further block hydrogen plasma generated in subsequent processes from diffusing toward each transistor to ensure stability of each transistor. The second source-drain layer 37 may be disposed on a side, distal from the substrate 1, of the second protection layer 363, and may be connected to the drain of the transistor by a via extending through the second protection layer 363, the first planarization layer 362, and the first protection layer 361.

In the above embodiment of the present disclosure, the second source-drain layer 37 may include a first conductive layer and a second conductive layer arranged at intervals, wherein the first conductive layer may be connected to the drain of the first transistor in order to electrically elicit the first transistor. The second conductive layer may be connected to the drain of the second transistor in order to electrically elicit the second transistor.

In the above embodiment of the present disclosure, the second source-drain layer 37 may only include a second conductive layer, wherein the second conductive layer may be connected to the drain of the second transistor in order to electrically elicit the second transistor.

In one embodiment of the present disclosure, as shown in FIG. 10, the array substrate 100 further includes a first light shielding layer 5, which may be disposed on a side, distal from the substrate 1, of the driving layer 3. For example, the first light shielding layer 5 may be disposed on the side, distal from the substrate 1, of the first insulating layer 36 and may be disposed with the second source-drain layer 37 in the same layer.

In one embodiment, the first light shielding layer 5 may be an extended structure of the second source-drain layer 37. For convenience of process, the first light shielding layer 5 may be manufactured by the same manufacturing process as the second source-drain layer 37. The first light shielding layer 5 may be made of a light shielding material, for example, a light shielding metal.

The first light shielding layer 5 may include a plurality of first light shielding units 51 arranged in an array and a plurality of second light shielding units 52 arranged in an array. The plurality of first light shielding units 51 may be disposed in one-to-one correspondence with the plurality of first transistors, and the orthographic projection of each of the first light shielding units 51 on the substrate 1 may be at least partially overlapped with the orthographic projection of the first transistor corresponding with the shielding unit 51 on the substrate 1. In this way, light reflected by the finger 12 may be blocked, and light reflected by the finger 12 may be prevented from being irradiated on the first transistor, thereby affecting the stability of the first transistor. In addition, the plurality of second shading units 52 may be disposed in one-to-one correspondence with the plurality of second transistors, and the orthographic projection of each of the second shielding units 52 on the substrate 1 and the orthographic projection of each of second light shielding units 52 on the substrate 1 may be at least partially overlapped with the orthographic projection of the first transistor corresponding with the second light shielding unit 52 on the substrate 1. In this way, light reflected by the finger 12 may be blocked, and light reflected by the finger 12 may be prevented from being irradiated on the second transistor, thereby affecting the stability of the second transistor.

The array substrate 100 may further include a second light shielding layer 6, which may be disposed between the driving layer 3 and the substrate 1. As shown in FIGS. 1 to 13, the second light shielding layer 6 may be disposed on a side, proximal to the driving layer 3, of the substrate 1, and the buffer layer 13 may be disposed on a side, distal from the substrate 1, of the second light shielding layer 6. The second light shielding layer 6 can block the ambient light and the backlight reflected by the finger 12 from being incident on the active layer 31 of the transistor, thereby further protecting the stability of the transistor.

Figure 14:
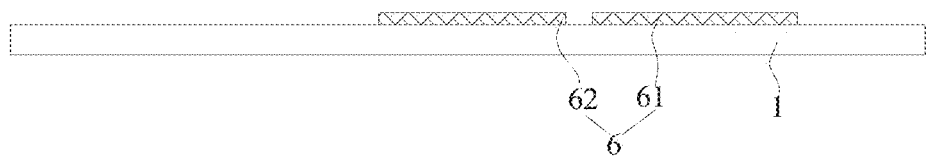
FIG. 14 is a schematic diagram of a second light shielding layer according to an embodiment of the present disclosure.

In one embodiment, the second light shielding layer 6 may be formed on the side, proximal to the driving layer 3, of the substrate 1 by vacuum evaporation, magnetron sputtering, chemical vapor deposition, or physical vapor deposition. For example, the second light shielding layer 6 may be formed by photolithography process. As shown in FIG. 14, the process of forming the second light shielding layer 6 may include: depositing a light shielding film layer on a side, proximal to the driving layer 3, of the substrate 1; forming a photoresist on a side, distal from the substrate 1, of the light shielding film layer; exposing and developing the photoresist with a mask to form a developing area, wherein the pattern of the developing area is the same as the pattern required by the second light shielding layer 6, and the size of the developing area is equal to the size of the desired pattern of the second light-shielding layer 6; anisotropically etching the light shielding film layer in the developing area to form the second light shielding layer 6; and finally stripping the remaining photoresist on the surface of the second light shielding layer 6 to expose the lithographically formed second light shielding layer 6.

In the above embodiment of the present disclosure, the second light shielding layer 6 may include a plurality of the third light shielding units 61 arranged in an array and a plurality of fourth light shielding units 62 arranged in an array. The plurality of third light shielding units 61 may be disposed in one-to-one correspondence with the plurality of first transistors, and the orthographic projection of each of third light shielding units 61 on the substrate 1 may be at least partially overlapped with the orthographic projection of first transistor corresponding with the third light shielding unit 61 on the substrate 1. In this way, the ambient light and the light reflected by the finger 12 may be prevented from being irradiated on active layer 31 of the first transistor, thereby affecting the stability of the first transistor. In addition, the plurality of fourth shielding units 62 may be disposed in one-to-one correspondence with the plurality of second transistors, and the orthographic projection of each of fourth light shielding units 62 on the substrate 1 may be at least partially overlapped with the orthographic projection of first transistor corresponding with the fourth light shielding unit 62 on the substrate 1. In this way, light reflected by the finger 12 may be blocked, and light reflected by the finger 12 may be prevented from being irradiated on the active layer 31 of the second transistor, thereby affecting the stability of the second transistor.

In the above embodiment of the present disclosure, the second light shielding layer 6 may include a plurality of the fourth light shielding units 62 arranged in an array. The plurality of fourth light shielding units 62 may be disposed in one-to-one correspondence with the plurality of second transistors, and the orthographic projection of each of fourth light shielding units 62 on the substrate 1 may be at least partially overlapped with the orthographic projection of first transistor corresponding with the fourth light shielding unite 62 on the substrate 1. In this way, the ambient light and light reflected by the finger 12 may be prevented from being irradiated on active layer 31 of the second transistor, thereby affecting the stability of the second transistor. In addition, each of the photoelectric sensing devices 2 may be arranged directly opposite to a corresponding first transistor, such that the photoelectric sensing device 2 blocks ambient light and the back light reflected by the finger 12 from being incident on the active layer 31 of the first transistor to ensure the stability of the first transistor. In this way, each of the photoelectric sensing devices 2 may be arranged directly opposite to a corresponding first transistor, which may refer to: the orthographic projection of each of the photoelectric sensing devices 2 on the substrate 1 and the orthographic projection of the corresponding first transistor on the substrate 1 are overlapped.

Figure 15:
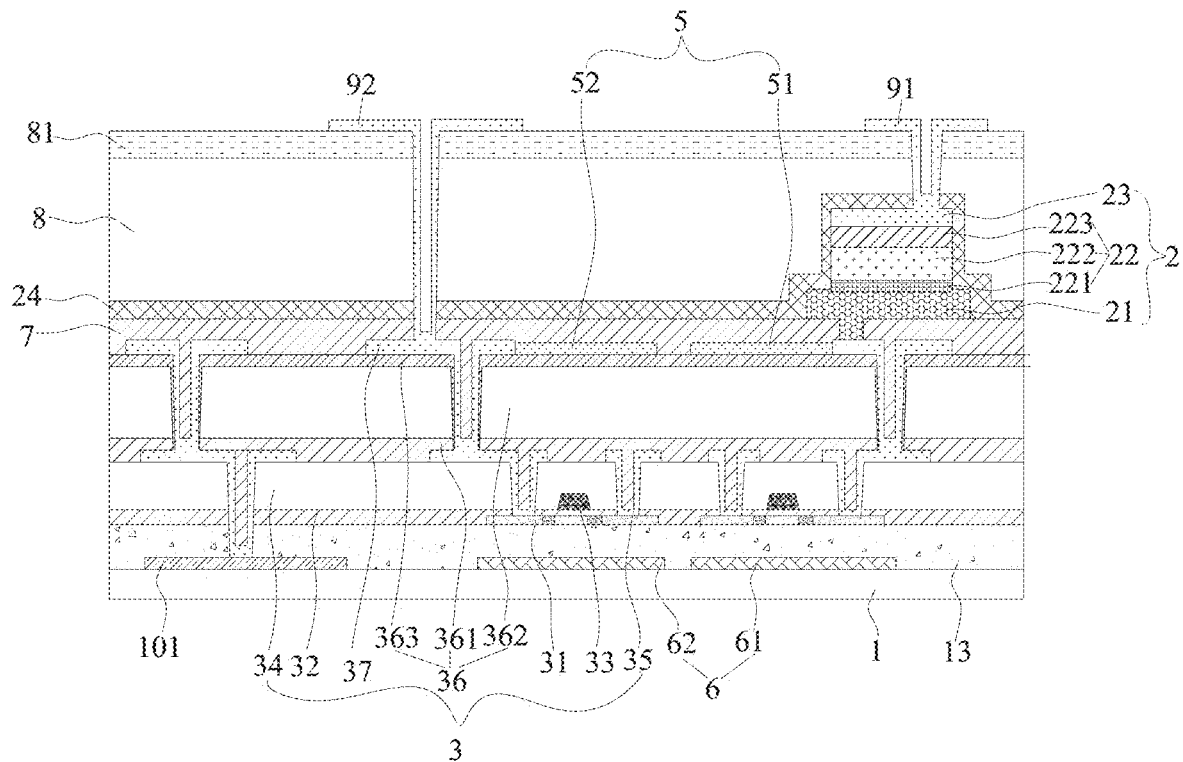
FIG. 15 is a schematic diagram of a protection layer, a planarization layer, and a conductive layer according to an embodiment of the present disclosure.

In the above embodiment of the present disclosure, as shown in FIG. 15, the array substrate 100 may further include a protection layer 7, a planarization layer 8, and a conductive layer.

Figure 16:
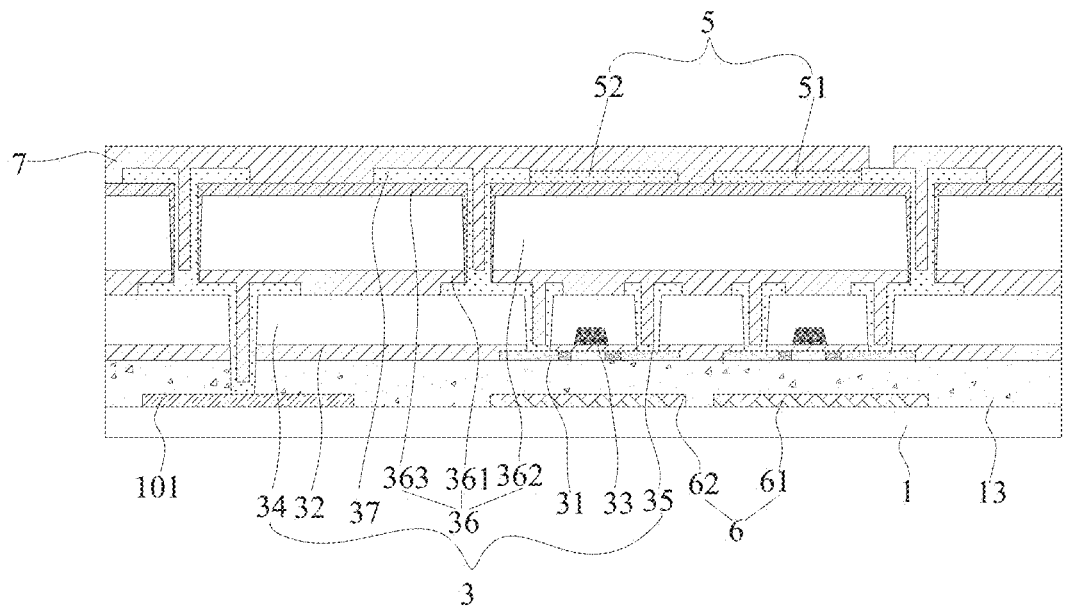
FIG. 16 is a schematic diagram of a protection layer according to an embodiment of the present disclosure.
Figure 17:
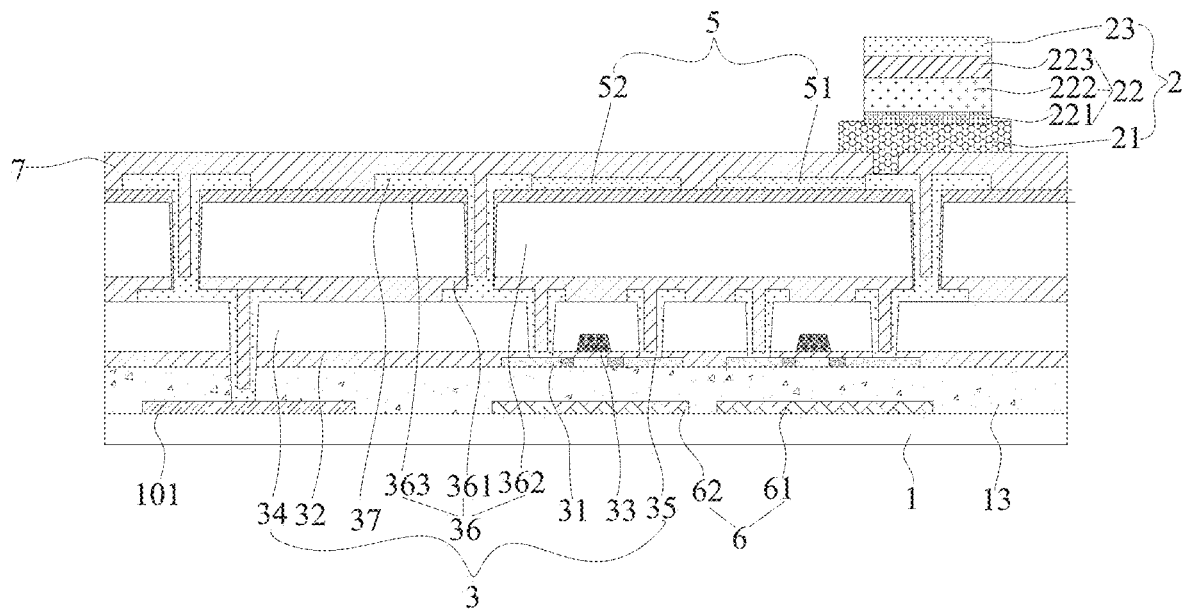
FIG. 17 is a schematic diagram of a photoelectric sensing device according to an embodiment of the present disclosure.
Figure 18:
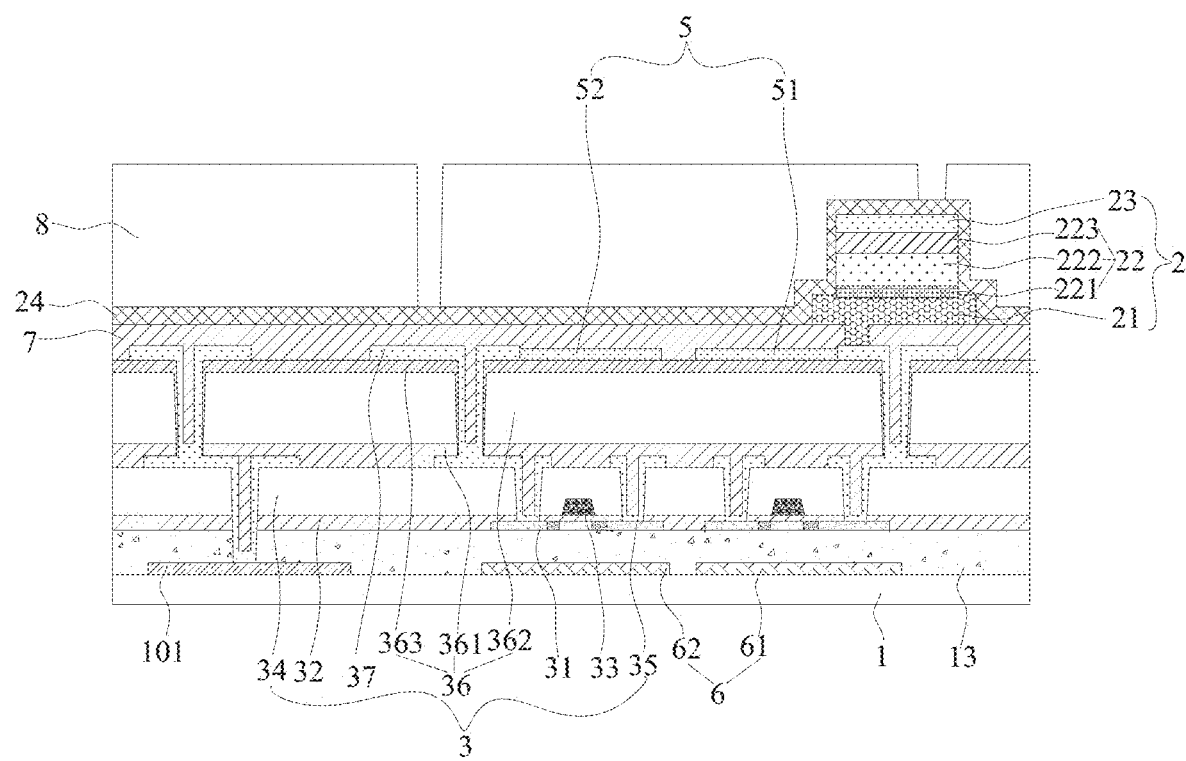
FIG. 18 is a schematic diagram of a planarization layer according to an embodiment of the present disclosure.

As shown in FIG. 16, the protection layer 7 may cover the surfaces of the second source-drain layer 37 and the first light shielding layer 5 to prevent affecting the performance of the second source-drain layer 37 and the first light shielding layer 5 in the subsequent processes. As shown in FIGS. 17 to 18, the photoelectric sensing device 2 may be disposed on the top surface of the protection layer 7, and the anode layer may be connected to the second source-drain layer 37 by a via extending through the protection layer 7. After the photoelectric sensing device 2 is formed, a layer of insulating material 24 may be deposited on the surface of the photoelectric sensing device 2 and the surface of the protective layer 7 to isolate the photoelectric sensing device 2 from other film layers, avoiding signal interference.

Figure 19:
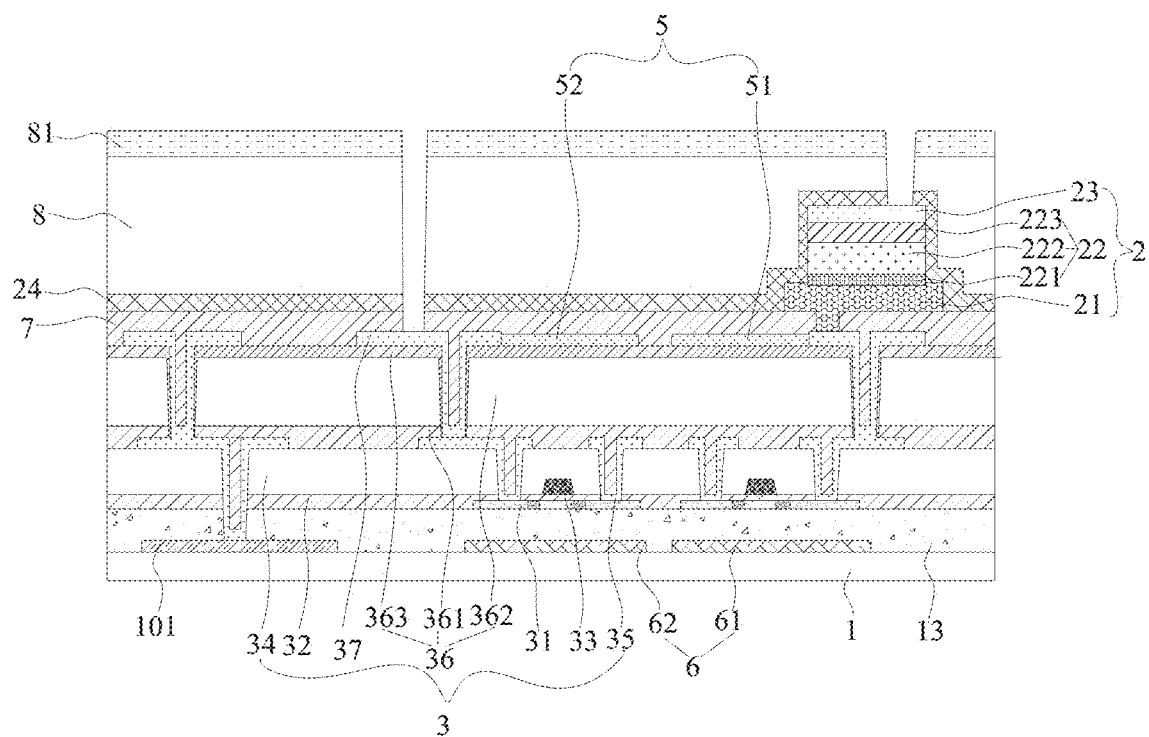
FIG. 19 is a schematic diagram of a passivation layer according to an embodiment of the present disclosure.

As shown in FIG. 18, the planarization layer 8 may cover the protection layer 7 and the photoelectric sensing device 2. For example, the planarization layer 8 may be covered on a side, distal from the substrate 1, of the insulating material 24 to eliminate the device misalignment of the photoelectric sensing device 2. The planarization layer 8 may have openings, which may be a plurality of vias in contact with the insulating material 24. As shown in FIG. 19, A passivation layer 81 may be formed on a side, distal from the substrate 1, of the planarization layer 8. The passivation layer 81 can protect the planarization layer 8 and avoid surface damage of the planarization layer 8. In addition, after the passivation layer 81 is formed, the bottoms of the vias may be further etched such that each via is connected to the second source-drain layer 37 and the photoelectric sensing device 2 respectively.

The conductive layer may be on the side, distal from the protection layer 7, of the planarization layer 8. For example, the conductive layer may be disposed on a side, distal from the substrate 1, of the passivation layer 81. The conductive layer may include a first conductor 91 and a second electrical conductor 92. The first conductor body 91 may be connected to the cathode layer of the photoelectric sensing device 2 with vias extending through the passivation layer 81, the planarization layer 8, and the insulating material 24 in order to electrically elicit the photoelectric sensing device 2. The second conductor 92 may be connected to the second conductive layer of the second source-drain layer 37 with vias extending through the passivation layer 81, the planarization layer 8, the insulating material 24, and the protection layer 7 in order to electrically elicit the second transistor.

Figure 20:
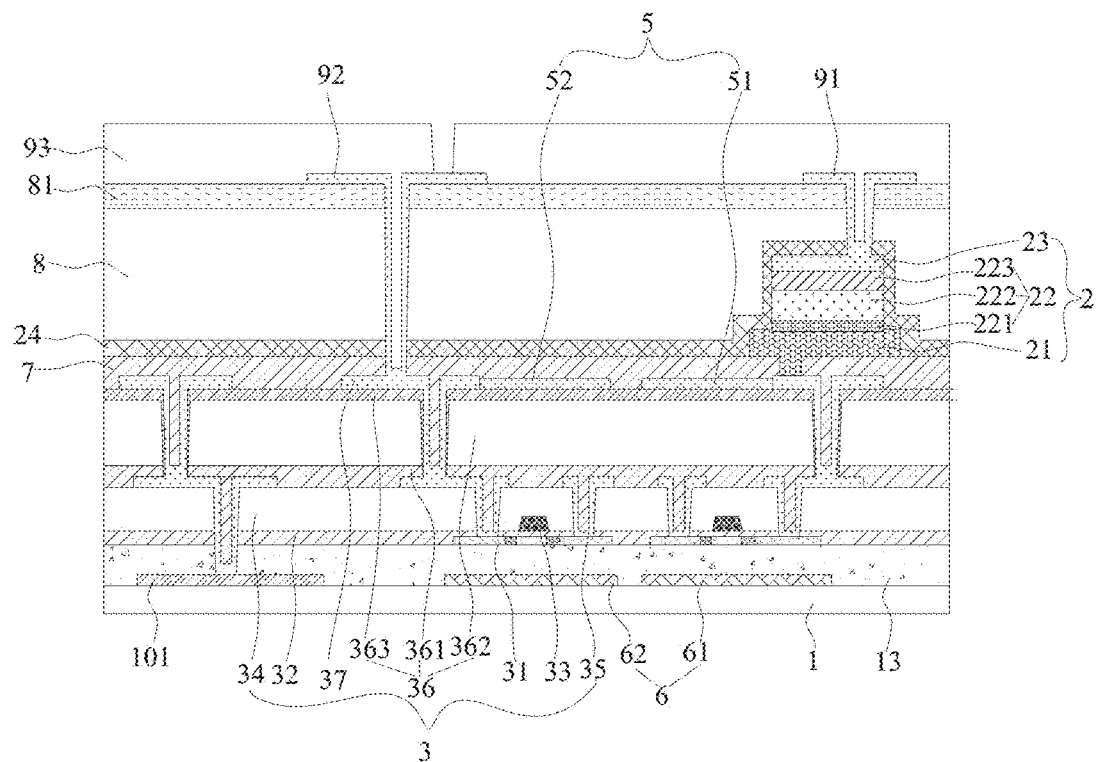
FIG. 20 is a schematic diagram of a second planarization layer according to an embodiment of the present disclosure.
Figure 21:
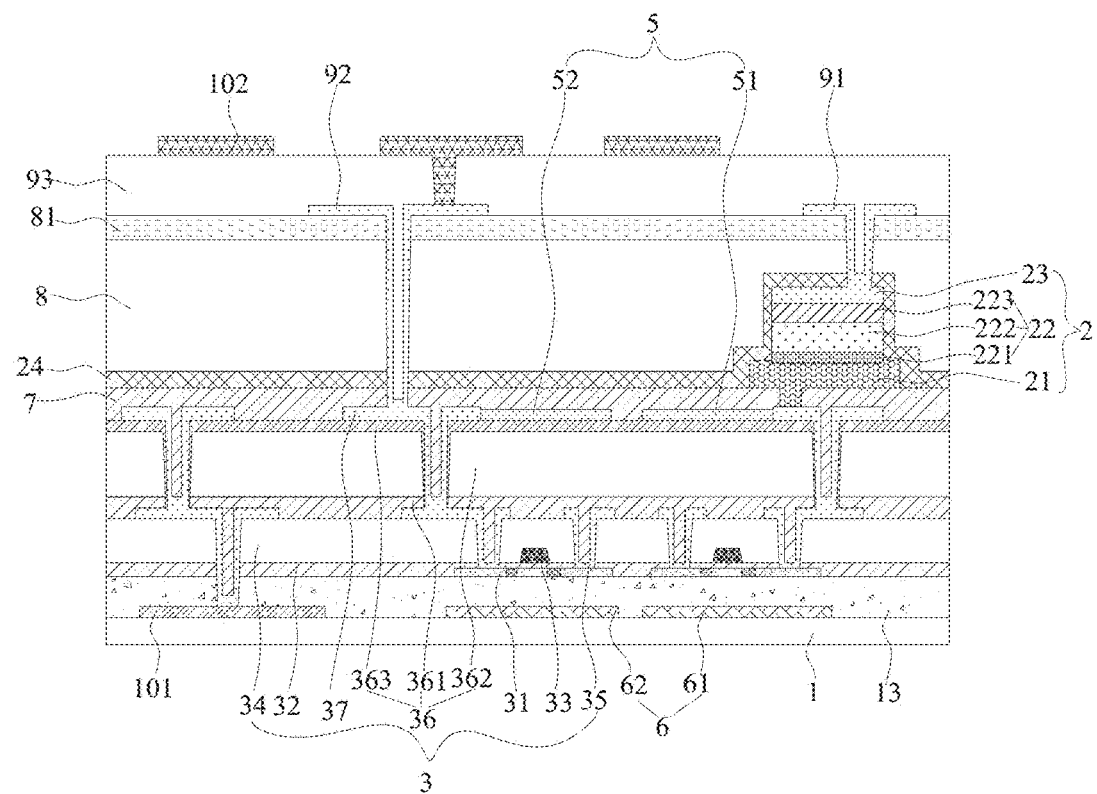
FIG. 21 is a schematic diagram of a common electrode according to an embodiment of the present disclosure.
Figure 22:
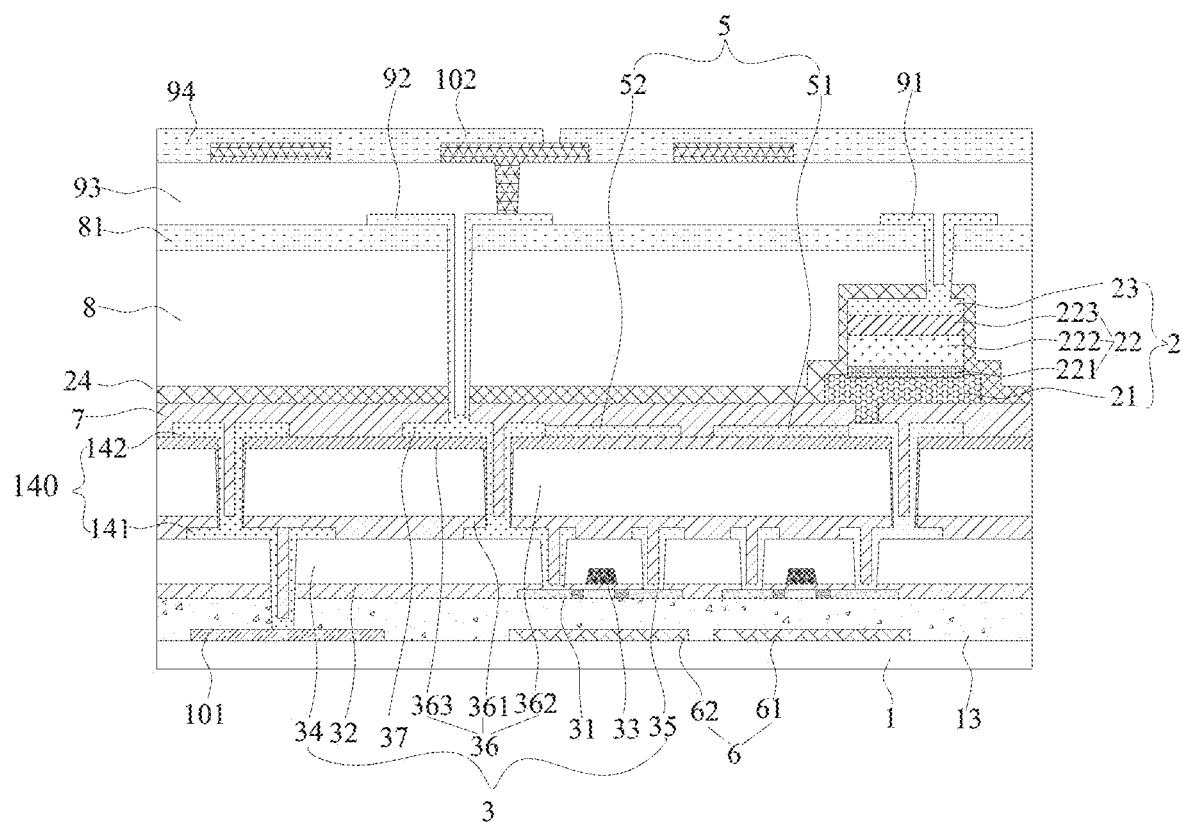
FIG. 22 is a schematic diagram of a third protection layer according to an embodiment of the present disclosure.

As shown in FIGS. 20 to 22, the second planarization layer 93 may be formed on the surface of the conductive layer and the passivation layer 81. The common electrode 102 may be formed on a side, distal from the substrate 1, of the second planarization layer 93, the common electrode 102 may be composed of a transparent conductive material, and the common electrode 102 may have an opening on the common electrode 102 that may be a via reserved to connect the pixel electrode 4 with the second conductor 92. In addition, the third protection layer 94 may cover the common electrode 102, the pixel electrode 4 may be formed on a side, distal from the substrate 1, of the third protection layer 94, and the pixel electrode 4 may be connected to the conductive layer.

In a second embodiment of the present disclosure, the array substrate 100 may further include a first inorganic barrier layer 110. The first inorganic barrier layer 110 may be formed on the surface of the substrate 1 by chemical vapor deposition, physical vapor deposition, or atomic layer deposition. The photoelectric sensing device 2 may be disposed on a side, distal from the substrate 1, of the first inorganic barrier layer 110. The first inorganic barrier layer 100 may block impurities in the substrate 1 from diffusing into the photoelectric sensing device 2 to protect the stability of the photoelectric sensing device 2. Meanwhile, the first inorganic barrier layer 100 may increase the adhesion between the transparent top electrode of the photoelectric sensing device 2 and the photoelectric functional layer 22 and the substrate 1.

The first electrode layer 21 of the photoelectric sensing device 2 may be disposed in the same layer with the first light shielding layer 5. The planarization material covering the first light shielding layer 5 and the photoelectric sensing device 2 may be formed by spraying or spin coating, or the like, and may be used as the planarization layer 120 after thermally curing of the planarization material. The planarization layer 12 can eliminate the device misalignment of the photoelectric sensing device 2 to ensure the stability of the subsequent preparation process of driving layer 3. To ensure light transmission, the planarization layer 120 may be a transparent material.

Referring to FIGS. 2 and 4, the array substrate 100 of the present disclosure may further include a second inorganic barrier layer 130 on a side, distal from the substrate 1, of the planarization layer 120. The buffer layer 13 may be disposed on a side, distal from the substrate 1, of the second inorganic barrier layer 130. The buffer layer 13 and the second inorganic barrier layer 130 may prevent the movable ions in the planarization layer 120 and below layers from diffusing into the driving layer 3 to protect the stability of each transistor in the driving layer 3, and to ensure the stability of the subsequent preparation process of the driving layer 3.

Figure 23:
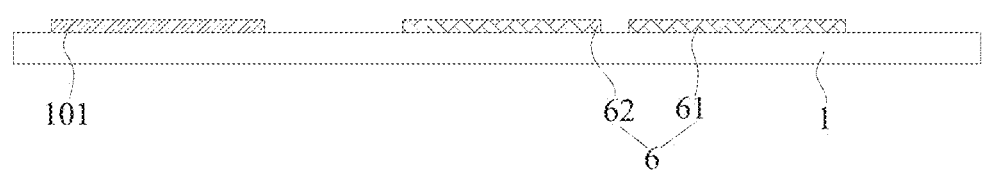
FIG. 23 is a schematic diagram of a touch control layer according to an embodiment of the present disclosure.

The array substrate 100 in the embodiment of the present disclosure may further include a touch control layer 101, as shown in FIGS. 22 and 23, which may be disposed on a surface of the substrate 1, wherein the touch control layer 101 may be used to trigger various circuit structures in the array substrate 100. The touch control layer 101 may be disposed in the same layer with the second light shielding layer 6, and may be electrically elicit through the conductive coating 140, wherein the conductive coating 140 may include the first conductive coating 141 and the second conductive coating 142. The first conductive coating layer 141 may be connected to the touch control layer 101 with vias extending through the inter-level dielectric layer 34, the gate insulating layer 32, and the buffer layer 13, and the second conductive coating layer 142 may be connected to the first conductive coating layer 141 through vias extending through the second protection layer 363, the first planarization layer 362, and the first protection layer 361.

In the manufacturing process, the first source-drain layer 35 and the vias needed to extend through the first conductive coating layer 141 may be formed by the same patterning process. Since the depth of the via that the first conductive coating layer 141 needs to extend is greater than the depth of the via that the first source-drain layer 35 needs to extend, so the first source-drain layer 35 needs to pass through vias that can extend the active layer 31 in the process of forming the via. The patterning process may also be controlled such that the vias that need to extend through the first source and drain layer 35 are in contact with the surface of the active layer 31, and the patterning process is not specifically limited herein.

It should be noted that all of the film layers in the embodiments of the present disclosure may be formed by photolithography process, specifically referring to the formation process of the second light shielding layer 6, which is not repeated herein.

The color filter substrate 200 may be disposed opposite the array substrate 100, and the color filter substrate 200 may include a substrate, a black matrix formed on the substrate, and a resin layer formed after the black matrix.

The resin layer may include a color filter layer and a protective layer, the color filter layer may include multiple color filters arranged at intervals, the plurality of color filters may include a red (R) color filter, a green (G) color filter, a blue (B) color filter, and the like. Each color filter corresponds to a sub-pixel unit, and the adjacent color filters are separated by a black matrix. The protective layer may cover the color filters and the black matrix to protect the color filters and the black matrix. The color filter substrate 200 and the array substrate 100 may be provided with a liquid crystal layer 400 that may be used to filter light entering the array substrate 100 and the liquid crystal layer 400.

The backlight module 300 may be disposed on the side, distal from the array substrate 100, of the color filter substrate 200 and may be used to provide a light source to the array substrate 100 for display and fingerprint recognition. The backlight module 300 may include a backlight and a light guide plate, light emitted from the backlight may exit uniformly after passing through the light guide plate, and is capable of passing through the fingerprint recognition region and light reflected by the fingerprint may be directly reflected into the photoelectric sensing device 2, without passing through the color filter substrate 200, which may reduce the distance between the photoelectric sensing device 2 and the finger 12, reduce light loss, increase the amount of signal received by the photoelectric sensing device 2, and thereby improving fingerprint recognition accuracy.

Figure 24:
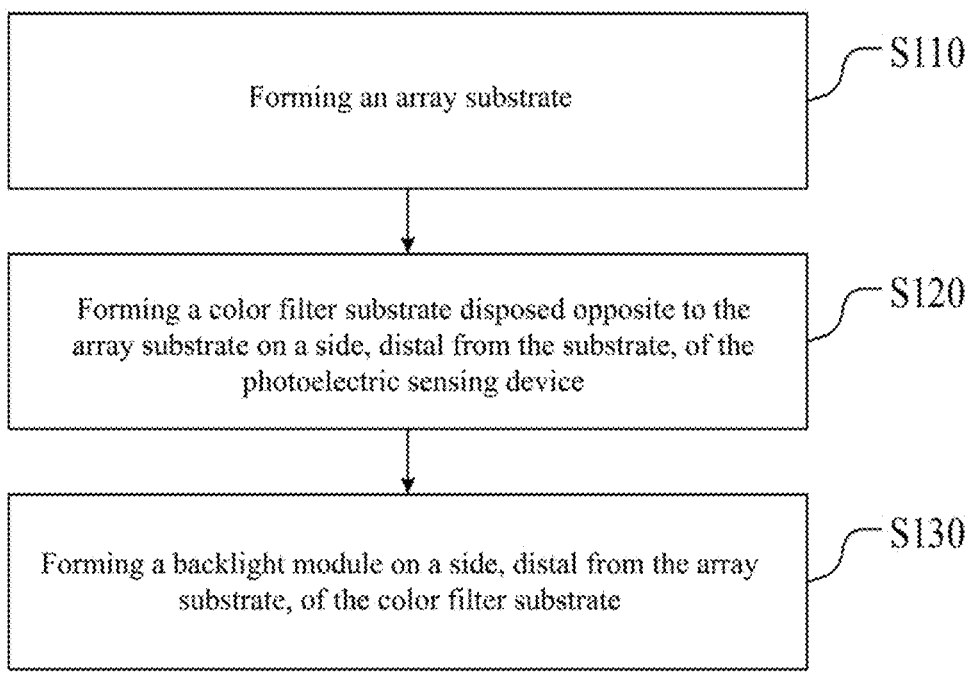
FIG. 24 is a flowchart of a method for manufacturing a display panel according to an embodiment of the present disclosure.

An embodiment of the present disclosure provides a method for manufacturing a display panel. As shown in FIG. 24, the method includes the following processes.

In S110, an array substrate is formed.

The array substrate with a fingerprint recognition region, and the array substrate including a substrate and a photoelectric sensing device, wherein the orthographic projection of each of the photoelectric sensing devices on the substrate is within the fingerprint recognition region.

In S120, a color filter substrate disposed opposite to the array substrate is formed on a side, distal from the substrate, of the photoelectric sensing device.

In S130, a backlight module is formed on a side, distal from the array substrate, of the film substrate.

Light emitted from the backlight module passing through the fingerprint recognition region.

In some embodiments of the present disclosure, S110 includes forming a driving layer on a side, proximal to the color filter substrate, of the substrate, wherein the driving layer includes sensing circuit, an orthographic projection of the sensing circuit on the substrate being at least partially within the fingerprint recognition region. A photoelectric sensing device is formed on a side, distal from the substrate, of the driving layer and is connected to the driving layer.

Figure 25:
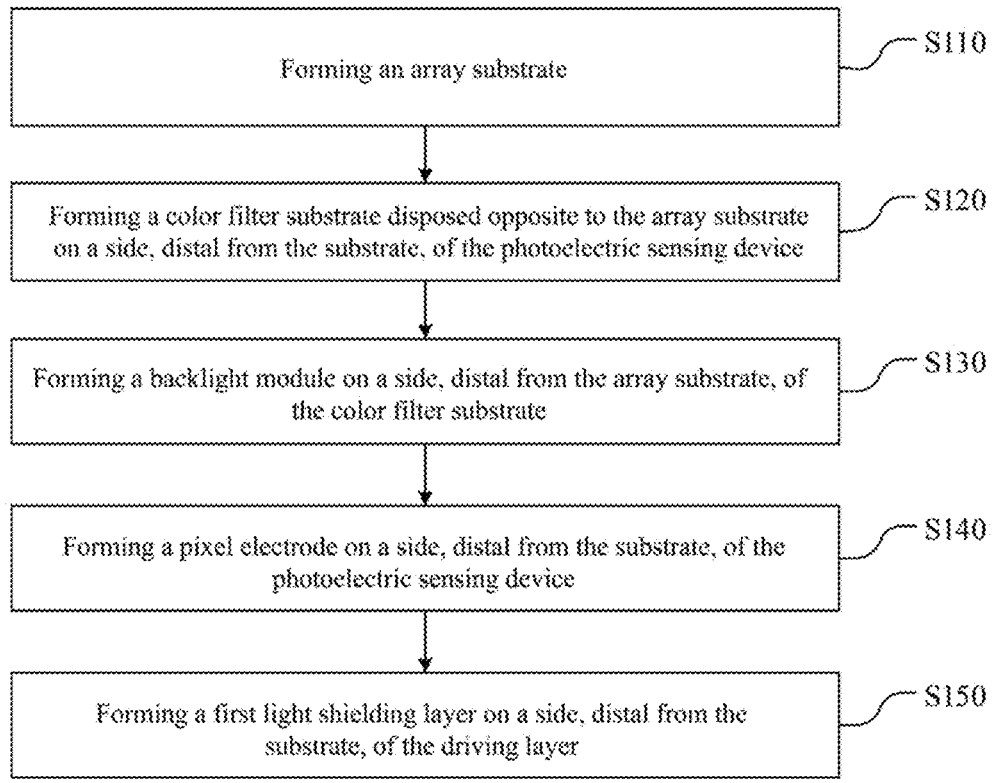
FIG. 25 is a flowchart of a method for manufacturing a display panel according to another embodiment of the present disclosure.

In some embodiments of the present disclosure, as shown in FIG. 25, the method may further include the following process.

In S140, pixel electrodes are formed on the side, distal from the substrate, of the photoelectric sensing device.

The driving layer further includes a pixel circuit, wherein the pixel circuit is connected to the pixel electrode. In some embodiments of the present disclosure, a plurality of photoelectric sensing devices and a plurality of pixel electrodes are provided. The sensing circuit includes a plurality of first transistors in one-to-one correspondence with a plurality of the photoelectric sensing devices; the pixel circuit includes a plurality of second transistors in one-to-one correspondence with a plurality of the pixel electrodes. Both the plurality of first transistors and the plurality of second transistors are arranged in an array;

In this case, the plurality of first transistors are connected to the plurality of photoelectric sensing devices in one-to-one correspondence, and the plurality of second transistors are connected to the plurality of pixel electrodes in one-to-one correspondence. The method may further include the following process.

In S150, a first light shielding layer is formed on the side, distal from the substrate, of the driving layer.

In this case, the first light shielding layer includes a plurality of first light shielding units in one-to-one correspondence with the plurality of first transistors, and a plurality of second light shielding units in one-to-one correspondence with the plurality of second transistors, wherein both the plurality of first light shielding units and the plurality of second light shielding units are arranged in an array. The orthographic projection of each of the first light shielding units is at least partially overlapped with the orthographic projection of first transistor corresponding with the first light shielding unit on the substrate. The orthographic projection of each of the second light shielding units is at least partially overlapped with the orthographic projection of second transistors corresponding with the second light shielding unit on the substrate.

The specific structures and beneficial effects of the array substrate 100, the color filter substrate 200, the backlight module 300, and other related structures of the display panel in the manufacturing method of the embodiment of the present disclosure have been described in the above display panel embodiment, which is not be repeated herein.

It should be noted that although the various processes of the method in the present disclosure are described in a specific order in the drawings, this does not require or imply that these processes need to be performed in the specific order, or that all the processes shown need to be performed to achieve the desired result. Alternatively, some processes may be omitted, these processes may be combined into one process for execution, and/or one process may be decomposed into a plurality of processes for execution, and the like.

Figure 26:
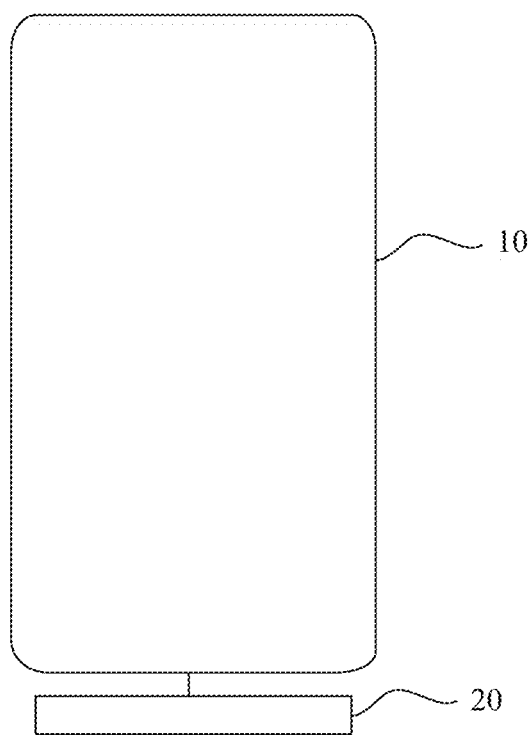
FIG. 26 is a structure schematic diagram of a display panel according to an embodiment of the present disclosure.

FIG. 26 is a schematic diagram illustrating a display device according to an embodiment of the present disclosure. Referring to FIG. 26, the display device may include a power supply 20 and a display panel connected to the power supply 20. The power supply 20 may be used to power a display panel. The display panel may be the display panel 10 provided by the embodiments described above. The structure and benefits of the display panel 10 may be referred to embodiments of the display panel described above, and will not be described in further detail herein.

The display device according to the embodiment of the present disclosure may be a device for displaying images such as a mobile phone, a tablet computer, a TV, or the like, which is not listed herein.

Described above only exemplary embodiments of the present disclosure and are not intended to limit the present disclosure. Any modification, equivalent replacement, improvement, and the like made within the spirit and principle of the present disclosure shall be included in the protection range of the present disclosure.

What is claimed is:

1. A display panel, comprising:
   an array substrate, comprising a substrate and a photoelectric sensing device, wherein the substrate is provided with a fingerprint recognition region, and an orthographic projection of the photoelectric sensing device on the substrate is within the fingerprint recognition region;
   a color filter substrate, disposed opposite to the array substrate; and
   a backlight module, disposed on a side, distal from the array substrate, of the color filter substrate, wherein light emitted from the backlight module is capable of passing through the fingerprint recognition region;
   wherein the array substrate further comprises:
   a driving layer, disposed between the substrate and the photoelectric sensing device, wherein the driving layer comprises a sensing circuit, an orthographic projection of the sensing circuit on the substrate being at least partially within the fingerprint recognition region, and the sensing circuit being connected to the photoelectric sensing device;
   a pixel electrode, disposed on a side, distal from the substrate, of the photoelectric sensing device; and
   the driving layer further comprises a pixel circuit, wherein the pixel circuit is connected to the pixel electrode.

2. The display panel according to claim 1, wherein a plurality of photoelectric sensing devices and a plurality of pixel electrodes are provided, the sensing circuit comprises a plurality of first transistors in one-to-one correspondence with the plurality of photoelectric sensing devices, and the pixel circuit comprises a plurality of second transistors in one-to-one correspondence with the plurality of pixel electrodes, both the plurality of first transistors and the plurality of second transistors being arranged in an array;
   wherein the plurality of first transistors are connected to the plurality of photoelectric sensing devices in one-to-one correspondence, and the plurality of second transistors are connected to the plurality of pixel electrodes in one-to-one correspondence.

3. The display panel according to claim 2, wherein the array substrate further comprises: a first light shielding layer, disposed on a side, distal from the substrate, of the driving layer;
   the first light shielding layer comprises: a plurality of first light shielding units in one-to-one correspondence with the plurality of first transistors, and a plurality of second light shielding units in one-to-one correspondence with the plurality of second transistors, both the plurality of first light shielding units and the plurality of second light shielding units being arranged in an array;
   wherein an orthographic projection of each of the first light shielding units on the substrate is at least partially overlapped with an orthographic projection of a first transistor corresponding to the first light shielding unit on the substrate, and an orthographic projection of each of the second light shielding units on the substrate is at least partially overlapped with an orthographic projection of a second transistor corresponding to the second light shielding unit on the substrate.

4. The display panel according to claim 2, wherein the array substrate further comprises: a second light shielding layer, disposed between the driving layer and the substrate;
   wherein the second light shielding layer comprises: a plurality of third light shielding units in one-to-one correspondence with the plurality of first transistors, and a plurality of fourth light shielding units in one-to-one correspondence with the plurality of second transistors, both the plurality of third light shielding units and the plurality of fourth light shielding units being arranged in an array;
   wherein an orthographic projection of each of the third light shielding units on the substrate is at least partially overlapped with an orthographic projection of the first transistor corresponding to the third light shielding unit on the substrate, and an orthographic projection of each of the fourth light shielding units on the substrate is at least partially overlapped with an orthographic projection of the second transistor corresponding to the fourth light shielding unit on the substrate.

5. The display panel according to claim 2, wherein both the first transistor and the second transistor comprise:
   an active layer, disposed on a side, proximal to the first light shielding layer, of the substrate;
   a gate insulating layer, covering the active layer;
   a gate, disposed on a side, distal from the substrate, of the gate insulating layer;
   an inter-level dielectric layer, covering the gate and the gate insulating layer; and
   a first source-drain layer, disposed on a side, distal from the substrate, of the inter-level dielectric layer and comprising a source and a drain, the source and the drain being connected to both ends of the active layer respectively.

6. The display panel according to claim 5, wherein the driving layer further comprises: a first insulating layer and a second source-drain layer; wherein
   the first insulating layer covers the first source-drain layer; and
   the second source-drain layer is disposed on a side, distal from the substrate, of the first insulating layer and comprises a first conductive layer and a second conductive layer that are spaced apart, the first conductive layer being connected to a drain of the first transistor, and the second conductive layer being connected to a drain of the second transistor; and
   the second source-drain layer and the first light shielding layer are disposed in a same layer.

7. The display panel according to claim 5, wherein the array substrate further comprises:
   a protection layer, covering the second source-drain layer and the surface of the first light shielding layer, wherein the photoelectric sensing device is disposed on an upper surface of the protection layer and is connected to the second source-drain layer through a via extending through the protection layer;
   a planarization layer, covering the protection layer and the photoelectric sensing device; and
   a conductive layer, disposed on a side, distal from the protection layer, of the planarization layer and comprising a first conductor and a second conductor, the first conductor being connected to the photoelectric sensing device, and the second conductor being connected to the second conductive layer.

8. A method for manufacturing a display panel, comprising:
forming an array substrate, wherein the array substrate comprises a substrate and a photoelectric sensing device, the substrate being provided with a fingerprint recognition region, and an orthographic projection of the photoelectric sensing device on the substrate being within the fingerprint recognition region;
forming a color filter substrate, wherein the color filter substrate is disposed opposite to the array substrate on a side, distal from the substrate, of the photoelectric sensing device; and
forming a backlight module on a side, distal from the array substrate, of the color filter substrate, wherein light emitted from the backlight module is capable of passing through the fingerprint recognition region;
wherein forming the array substrate comprises:
forming a driving layer on a side of the substrate, wherein the driving layer comprises a sensing circuit, an orthographic projection of the sensing circuit on the substrate being at least partially within the fingerprint recognition region;
forming a photoelectric sensing device on a side, distal from the substrate, of the driving layer, wherein the photoelectric sensing device is connected to the sensing circuit; and
forming a pixel electrode on the side, distal from the substrate, of the photoelectric sensing device;
wherein the driving layer further comprises a pixel circuit, the pixel circuit being connected to the pixel electrode.

9. The method according to claim 8, wherein a plurality of photoelectric sensing devices and a plurality of pixel electrodes are provided, the sensing circuit comprises a plurality of first transistors in one-to-one correspondence with the plurality of photoelectric sensing devices, and the pixel circuit comprises a plurality of second transistors in one-to-one correspondence with the plurality of pixel electrodes, both the plurality of first transistors and the plurality of second transistors being arranged in an array;
wherein the plurality of first transistors are connected to the plurality of photoelectric sensing devices in one-to-one correspondence, and the plurality of second transistors are connected to the plurality of pixel electrodes in one-to-one correspondence.

10. A display device, comprising: a power supply and a display panel connected to the power supply, the power supply being configured to supply power to the display panel, wherein the display panel comprises:
an array substrate, comprising a substrate and a photoelectric sensing device, the substrate being provided with a fingerprint recognition region, and an orthographic projection of the photoelectric sensing device on the substrate being within the fingerprint recognition region;
a color filter substrate, disposed opposite to the array substrate; and
a backlight module, disposed on a side, distal from the array substrate, of the color filter substrate, wherein light emitted from the backlight module is capable of passing through the fingerprint recognition region;
wherein the array substrate further comprises:
a driving layer, disposed between the substrate and the photoelectric sensing device, wherein the driving layer comprises a sensing circuit, an orthographic projection of the sensing circuit on the substrate being at least partially within the fingerprint recognition region, and the sensing circuit being connected to the photoelectric sensing device; and
a pixel electrode, disposed on a side, distal from the substrate, of the photoelectric sensing device;
wherein the driving layer further comprises a pixel circuit, wherein the pixel circuit is connected to the pixel electrode.

* * * * *